June 15, 1965 P. D. PAGE 3,189,806
MOTOR OPERATED POSITIONAL CONTROL FOR A SHAFT
Filed July 14, 1961 2 Sheets-Sheet 1
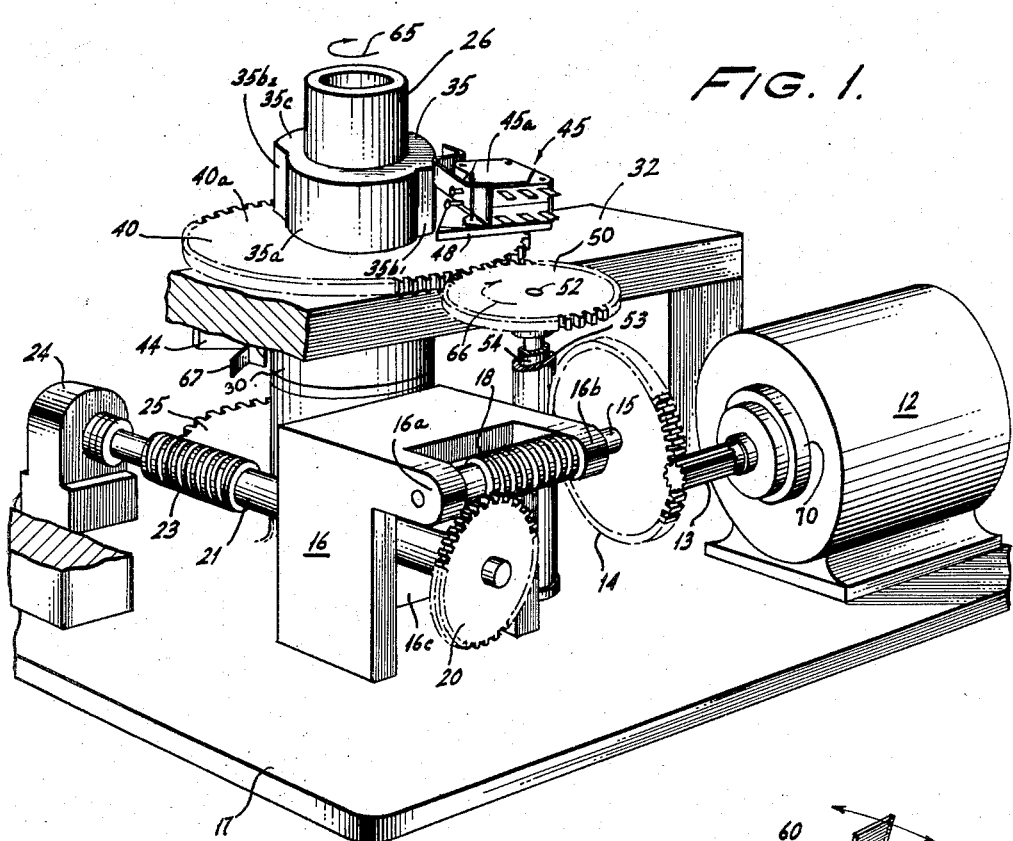
FIG. 1.
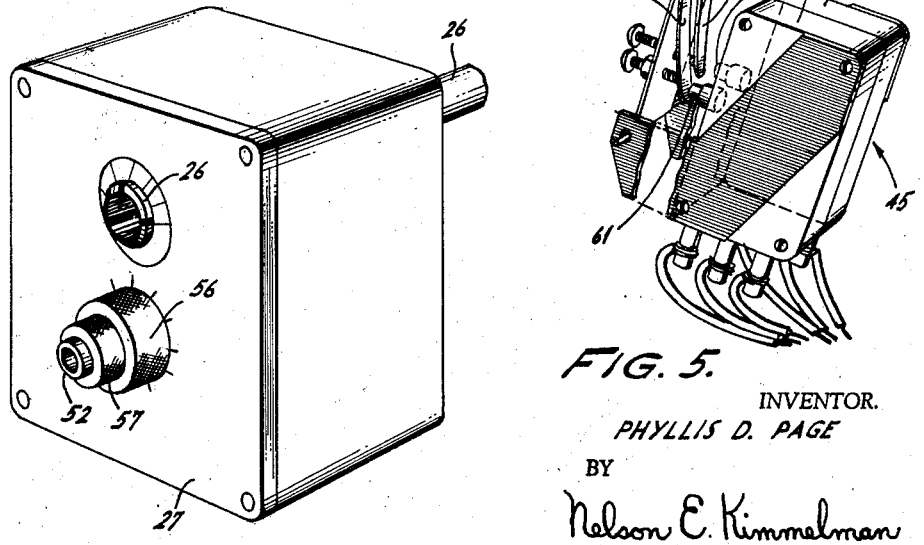
FIG. 2.
FIG. 5.
INVENTOR.
PHYLLIS D. PAGE
BY
Nelson E. Kimmelman
ATTORNEY June 15, 1965 P. D. PAGE 3,189,806
MOTOR OPERATED POSITIONAL CONTROL FOR A SHAFT
Filed July 14, 1961 2 Sheets-Sheet 2

INVENTOR.
PHYLLIS D. PAGE
BY
Nelson E. Kimmelman
ATTORNEY

United States Patent Office 3,189,806
Patented June 15, 1965

3,189,806
MOTOR OPERATED POSITIONAL CONTROL
FOR A SHAFT
Phyllis Dillman Page, Aldan, Pa., assignor to Automatic Timing & Controls, Inc., King of Prussia, Pa., a corporation of Pennsylvania
Filed July 14, 1961, Ser. No. 124,030
1 Claim. (Cl. 318—31)

This invention relates to a novel motorized valve operator and in particular to a novel control for moving a shaft or like member to a desired angular position, as for example, moving the shaft attached to the air damper of a boiler.

Previously, electrical damper controls were known which could set the damper only to certain predetermined angular positions. Thus, other intermediate settings which may have been desired for maximum efficiency or for other practical reasons, were unattainable with that type. Consequently, previous damper operators often were wasteful of fuel and hence raised the operating cost of the boiler. Other rotating shaft controls were also known which permitted adjustment of the shaft angle to any desired position but they required electronic servomechanisms and other electrical components which made for complex and expensive control systems.

It is therefore an object of the present invention to provide an improved motorized operator.

Still another object of the invention is to provide an improved motorized valve operator capable of greater adjustability features than previous ones.

Another object of the invention is to provide an improved rotary motion control device for controlling the angular position of a rotatable member.

Yet another object of the invention is to provide an improved damper control for setting a damper to any desired angular position.

Another aim of the invention is to provide a relatively simple, inexpensive, and essentially electromechanical shaft angle control device.

Other objects of the invention will be apparent to those skilled in the art upon perusal of the drawings, specifications, and claims herein.

FIGURE 1 is a perspective and partly sectional view of one form of apparatus which my invention may take;

FIGURE 2 shows a housing for the apparatus of FIG. 1;

FIGURE 5 is a perspective view of the cam follower switches shown in FIGS. 1, 3 and 4.

In accordance with my invention I provide a shaft which is adapted to be coupled to a member of the device to be controlled. Fixed to this shaft is a cam which is constructed to be engaged by switches mounted on a gear concentric with the shaft. The gear is settable to a desired rotary position about the shaft by an attendant, depending on the desired position of the controlled member. The cam and cam-following switches are so arranged that the shaft always follows the movement of the gear until a certain region of the cam is engaged by the switches. Thus, the shaft and hence the controlled member may be set at any desired angular position.

CONTROL SHAFT DRIVER

Figure 6:
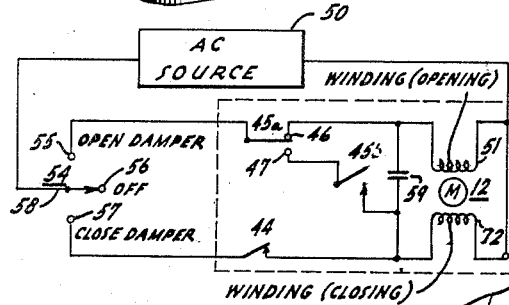
FIGURE 6 is a schematic diagram of an electrical circuit for which the apparatus of FIG. 1 is well adapted.

Referring to FIGURE 1 especially, a motor 12, which may be a reversible condenser-type motor, for example, is adapted for connection to an external source of power 50 (see schematic FIG. 6). To the motor shaft is connected a spur pinion 13 which drives a spur gear 14 mounted at the end of a shaft 15 carried in a mounting bracket 16 which is fixed upon a plate 17 (or formed integrally therewith as by a casting). The bracket 16 has two projecting arms 16a and 16b having apertures in which the shaft 15 is journalled.

On the shaft 15 a first reduction worm 18 is mounted which meshes with the teeth of a driven worm gear 20 which is mounted on a shaft 21. The shaft 21 passes through bearings located within an aperture in the vertical back portion 16c of the mounting bracket 16. On the left side (as seen by the reader) of the member 16c there is mounted upon the shaft 21 a second reduction worm 23. The end of the shaft 21 passes through thrust bearings and is journalled into an end mounting bracket 24 which is mounted upon the plate 17 or formed integrally therewith as by a casting.

Figure 3:
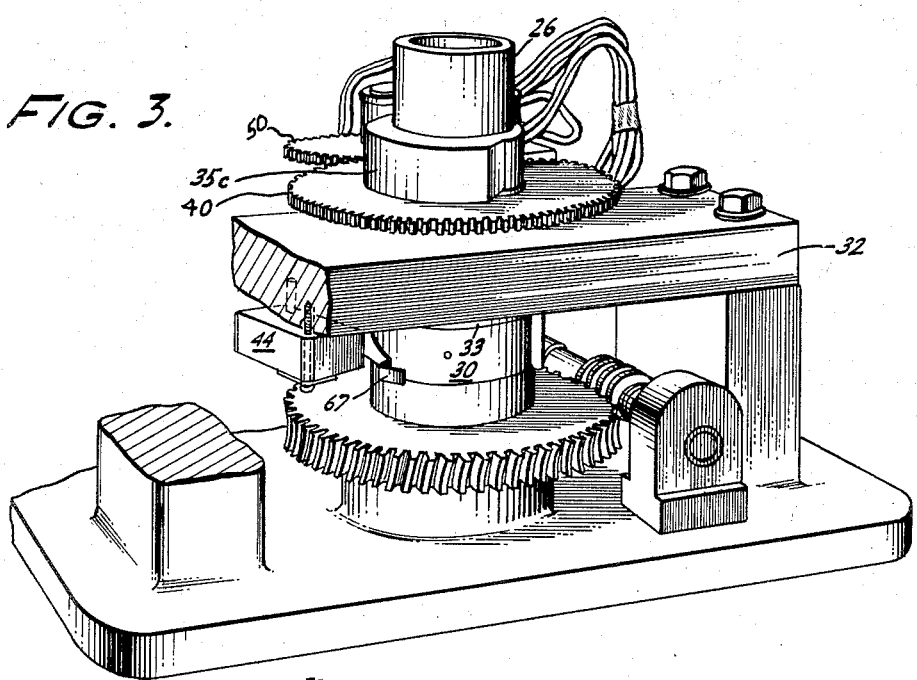
FIGURE 3 is a perspective and partly sectional view of the apparatus shown in FIG. 1 as viewed from a different angle.

The second worm 23 engages a large worm gear 25 which is fixedly mounted upon a control shaft 26. The shaft 26 passes through a mounting plate 32 (FIG. 3) and its other end passes through the plate 17 and through a coverplate 27 (see FIG. 2) which fits over plate 17. The shaft 26 is hollow to permit the shaft of the device to be controlled to pass through it. The end of shaft 26 which protrudes through the coverplate 27 is notched (see FIG. 2) so that the shaft of the device which is to be controlled can be keyed therewith. These notches also permit one to observe the instantaneous angular position of the shaft 26.

CAM STRUCTURES

There is also fixedly mounted on the shaft 26 below plate 32 a cam 30 made of "Nylon," for example, which rotates therewith. A switch assembly 44 is mounted fixedly to the underside of plate 32 and its follower arm 67 engages the cam 30. When the follower arm 67 is urged outward from the cam 30 by the thicker part of the latter it depresses a button in switch 44 causing actuation thereof. Between the cam 30 and the mounting member 32 is a thrust washer 33.

The shaft 26 also carries another cam 35 fixed thereto on the upper side of plate 32. Between the cam 35 and the mounting plate 32 is a gear 40 mounted for frictionless rotation about the shaft 26. The gear 40 carries a switch assembly 45 mounted on a plate 48 which is itself fixedly mounted on the upper surface 40a. The gear 40 meshes with a gear 50 which is fixedly mounted at the end of a shaft 52 which passes in a bearing sleeve 54 through the bore of a cylindrical member 53. The cylindrical member 53 is mounted in an aperture in the plate 17. The shaft 52 passes out through the end of the cylindrical member 53 (FIG. 2) and toward its external end knobs 56 and 57 are fixedly connected. These knobs permit the operator to set the rotary position of switch assembly 45 and hence the damper at the desired angular position thereby regulating the amount of air intake into the boiler. How this is accomplished will be explained below in detail.

ELECTRICAL CIRCUIT

The principle of operation of this apparatus may be better understood from an electrical point of view, by examination of the schematic shown in FIG. 6. Elements shown within the broken-line rectangle are enclosed within the housing shown in FIG. 2. An A.C. source 50 is adapted to have one of its terminals connected to the common junction of the end of the damper "opening" winding 51 and one end of the damper "closing" winding 72 within the motor 12. The other terminal of the A.C. source may be connected to a switch 54 having "open,"

"off" and "close" contacts 55, 56, and 57 respectively which the moveable arm 58 engages at the choice of an attendant at the main control panel governing the boilers in a particular installation, for example. When the arm 58 is moved into connection with the contact 56, the apparatus is not energized. When the arm 58 touches contact 55 the winding 51 may be energized (assuming certain switches are closed as will be explained hereinafter) whereupon the motor 12 causes the shaft 26, via the intermediate gear train previously described, to revolve in such a direction that the damper is opening. A capacitor 59 having a large value of capacitance is connected to the ends of the windings 51 and 72 which are not commonly joined. In series with the winding 51 is a switch 45a which is a single pole, double throw switch and which is connected so that the switch arm normally makes contact with the contact 46 which is directly connected to winding 51. Another contact 47 is in series with switch 45b and winding 72. Another switch 45b is adapted to be connected in series with contact 47 and the winding 72. A third switch 44 is connected in series between contact 57 and the winding 72.

Operation—Opening

When it is desired to open the damper to a certain angular position, the attendant at the main control panel will throw the switch 54 so that the arm 58 is connected to the contact 55. Another attendant at the particular boiler, to whose damper the apparatus herein is connected, will set that boiler's damper to a desired angular position by turning the shaft 52 by means of the knobs 57 and 56 (FIG. 2) which causes the gear 50 to revolve which, in turn causes the gear 40 and the switch assembly 45 mounted thereupon also to revolve.

Figure 4:
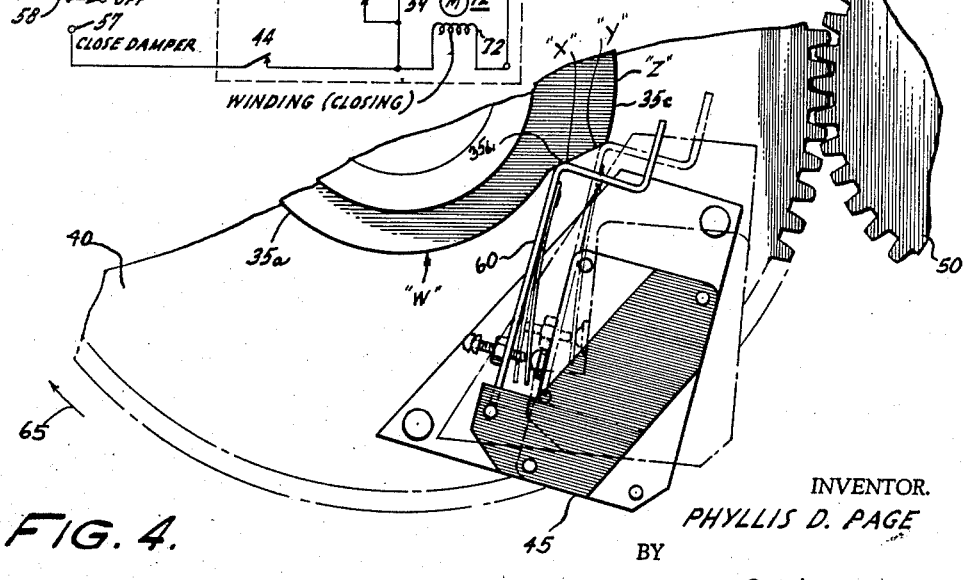
FIGURE 4 is a plan (partly phantom) view of part of the apparatus shown in FIGS. 1 and 3.

It will first be assumed that when the switch arm 58 is thrown to engage contact 55 the shaft will rotate in the direction indicated by the arrow 65 (FIGS. 1 and 4). It will further be assumed that the switch 45 is located so that its arm 60 (FIG. 5) is resting at point "W" (FIG. 4) on the lower surface 35a of cam 35. As the shaft 26 rotates in the assumed direction, the arm 60 approaches the inclined portion $35b_1$ and eventually starts to ride up on the latter. At a certain point "X" (FIG. 4) on the incline $35b_1$ the knee of arm 60 causes the finger 63 (which is urged inwardly more than the finger 64 by the setting of its set screw as shown in FIG. 5) will depress the button 61 of switch 45a sufficiently to move the arm of the latter from contact 46 to touch contact 47 (FIG. 6). In so doing the circuit of the damper "opening" winding 51 is broken and thus the motor 12 will stop thereby stopping movement of shaft 26 and the damper shaft coupled thereto. It will be noted that "closing" winding 72 will not be energized since the switch 45b is still normally open. When the shaft stops turning, the damper will have been set to the angular position established by the attendant in charge of the particular boiler.

Operation—Further opening

If the attendant after some time interval decided that the damper needed to be moved more open, i.e., in the same rotary direction as before, he would turn knobs 56 and 57 in a clockwise direction (viewed looking at coverplate 27) which would cause the switch assembly on gear 40 once more to be moved into a position where its arm 60 engaged the low portion 35a of cam 35. This movement of switch 45a would cause its switch arm to engage contact 46 once again whereupon the winding 51 of motor 12 would be energized and the shaft would continue to rotate in the direction of arrow 65. When the arm 60 again rode up inclined portion $35b_1$ to point "X" it would throw the arm of switch 45a to the other contact 47 thereby opening the circuit of winding 51 and shutting off motor 12.

Operation—Closing

Let us next suppose that the attendant for the particular boiler now wants to move the damper in the rotary direction opposite that indicated by arrow 65. He would therefore turn knobs 56 and 57 in a counter-clockwise direction to the desired angular position indicated on the coverplate 27 by the keyed shaft 26. This turning causes the gear 50 to turn in the direction indicated by the broken-line arrow 66 (FIG. 1) which causes the gear 40 to turn so that the arm 60 rides up even further on the portion $35b_1$ until it passes point "Y" (FIG. 4) and comes to rest at a given point, say "Z," (FIG. 4) on the high surface 35c. On passing "Y" the finger 64 (FIG. 5) on arm 60 depresses the button 62 of switch 45b sufficiently to cause the latter to close. Since the arm of switch 45a already is touching contact 47, the "closing" winding 72 is energized and the shaft 26 starts to rotate in a direction opposite the one shown by arrow 65 thereby causing the switch assembly 45 to approach once again the lower surface 35a of cam 35. When the arm 60 passes point "Y" switch 45b opens again so that no current flows to winding 72 and the motor 12 stops because the arm of switch 45a is simultaneously touching contact 47. If the knobs 56 and 57 were then turned to open the damper more the switch assembly 45 would go further down the incline $35b_1$. On passing "X" the arm of switch 45a would touch contact 46 so that the "opening" winding 51 would start to be energized once again causing the shaft 26 and cam 35 to revolve until the knee of arm 60 once again touches "X" whereupon switch 45a opens the circuit to winding 51 and the motor 12 stops.

To limit the rotary motion of shaft 26 in the "closed" direction a switch 44 is provided. Unless the damper is fully closed the switch 44 is normally closed. It is seen that if the shaft 26 and hence the cam 30 continues movement in the direction of arrow 65 the knee of switch arm 67 will travel up incline $30b_1$ until the switch 44 is actuated thereby opening the circuit to winding 72 and shutting off the motor.

If desired, the apparatus described herein may be provided with an external meter which indicates the position of the damper at a point remote from the damper operator itself. Thus, for example, there could be attached to the end of shaft 21 (or elsewhere) a potentiometer arm whose position would vary as a function of the rotary position of that shaft. If the potentiometer were placed in series with a voltmeter and an energizing source, the voltage shown by the voltmeter could be calibrated to show the angular position of the shaft 21 and hence the angular position of the shaft 26.

In addition, the apparatus may be provided with an electro-mechanical brake acting upon a desired point in the gear system to halt the action thereof coincident with de-energization of the motor 12. For example, a mechanical brake may be adapted to bear upon the hub 70 when the motor 12 ceases operation.

Still other modifications and applications of the device may occur to those skilled in the art which embody or make use of the invention described herein without departing from the essence thereof. Consequently, I desire my invention to be limited only by the claims herein.

I claim:

A control device comprising: a hollow control shaft adapted to be coupled to a device whose angular position is to be controlled, motor means adapted for connection to a power source, first gear means fixedly coupled to said shaft and also coupled to said motor means for imparting rotary motion to said control shaft in first or second opposite rotary directions when said motor means is energized, a first cam fixedly mounted around said shaft, a second gear mounted for movement about said shaft and coaxial therewith, said second gear having switches fixed to one of its two opposed surfaces, said switches including a cam follower arm for engaging the cam surface, means for setting the rotary position of said second gear relative to said first cam so that said arm engages a desired portion of the surface of said cam, said setting corresponding to a selected angular position of said control shaft, said switches being constructed and arranged to be responsive to the surface of said cam at said portion to cause said motor to drive said first gear means and said control shaft until said shaft arrives at said desired angular position, said switches also being constructed and arranged to inactivate said motor when said control shaft is at said selected angular position, said switches are two in number and are operated by said arm at respectively different portions of said cam surface, and a second cam fixedly mounted around said shaft for rotation with said shaft and a stationary cam-follower switch for deactivating said motor at a predetermined limit position of said shaft.

References Cited by the Examiner
UNITED STATES PATENTS

| | | | |
|---|---|---|---|
| 2,035,602 | 3/36 | Hubbard | 318—31 X |
| 2,249,237 | 7/41 | Fulton | 318—468 X |
| 2,471,220 | 5/49 | Lear | 318—31 |

ORIS L. RADER, *Primary Examiner.*